(12) United States Patent
Lee

(10) Patent No.: US 9,166,467 B2
(45) Date of Patent: Oct. 20, 2015

(54) FLICKER-FREE CONVERTER FOR DRIVING LIGHT-EMITTING DIODES

(71) Applicant: Sheng-Hann Lee, Saratoga, CA (US)

(72) Inventor: Sheng-Hann Lee, Saratoga, CA (US)

(73) Assignee: Sheng-Hann Lee, Saratoga, CA (US)

( * ) Notice: Subject to any disclaimer, the term of this patent is extended or adjusted under 35 U.S.C. 154(b) by 33 days.

(21) Appl. No.: 14/065,410

(22) Filed: Oct. 28, 2013

(65) Prior Publication Data

US 2015/0115812 A1 Apr. 30, 2015

(51) Int. Cl.
  *H05B 37/02* (2006.01)
  *H02M 1/15* (2006.01)
  *H05B 33/08* (2006.01)
  *H02M 1/42* (2007.01)
  *H02M 7/162* (2006.01)
  *H02M 1/00* (2007.01)

(52) U.S. Cl.
  CPC .............. *H02M 1/15* (2013.01); *H02M 1/4233* (2013.01); *H02M 1/4258* (2013.01); *H02M 7/1626* (2013.01); *H05B 33/0815* (2013.01); *H02M 2001/0038* (2013.01)

(58) Field of Classification Search
  CPC .......... H05B 33/0815; H05B 33/0848; H02M 3/156
  USPC ................................... 315/186, 294, 297, 307
  See application file for complete search history.

(56) References Cited

U.S. PATENT DOCUMENTS

2009/0289559 A1* 11/2009 Tanaka et al. ............. 315/185 R
2009/0315484 A1* 12/2009 Cegnar et al. ................. 315/307
2013/0009557 A1* 1/2013 Szczeszynski ................ 315/186

* cited by examiner

*Primary Examiner* — Don Le
(74) *Attorney, Agent, or Firm* — Winston Hsu; Scott Margo

(57) ABSTRACT

A spike-free converter for driving light-emitting diodes includes a closed loop direct current-direct current (dc-dc) converting unit, a switch, a first inductor, and a first diode. The closed loop dc-dc converting unit is used for generating a driving voltage to drive at least one light-emitting diode strings according to a dc voltage, and generating a switch control signal. The switch is used for receiving the switch control signal and being turned on and turned off according to the switch control signal.

27 Claims, 8 Drawing Sheets

FLICKER-FREE CONVERTER FOR DRIVING LIGHT-EMITTING DIODES

BACKGROUND OF THE INVENTION

1. Field of the Invention

The present invention relates to a converter for driving light-emitting diodes, and particularly to a core spike-free converter, followed by an expanded flicker-free converter for driving light-emitting diodes.

2. Description of the Prior Art

Please refer to FIG. 1. FIG. 1 is a diagram illustrating a classic dc-dc converter 100 as an offline light-emitting diode (LED) driver.

In operation, a clock generator A3 enables R/S flip flop (R/S FF) A1 to drive a switch M1 at a fixed frequency. A comparator A4 detects current flowing through the switch M1 through a resistor R2 to reset the R/S FF. A leading-edge blanking A2 temporarily disconnects feedback signal in a predetermined time interval, preventing turn-on spikes of the switch M1 from resetting the R/S FF prematurely. The turn-on spikes are generally caused by a diode D5 and the switch M1.

The open-loop detects maximum switching current (flowing through the switch M1) to turn off the switch M1 (turn-on interval), and uses the correlations to estimate current flowing through LED strings of diode D6 for a given clock frequency.

A first capacitor C1 is a stabilization capacitor storing sufficient energy through a bridge rectifier composed of diodes D1, D2, D3, and D4, to continue normal operations between the line charges. The diode D5 is a flyback diode that provides current path to an inductor T1, to continue feeding a capacitor C2 and the LED strings of diode D6 when the switch M1 is off (turn-off interval).

The capacitor C2 and the LED strings of diode D6 can also be in series with the diode D5. The tradeoff is the larger inductor T1 to store higher energy to recharge the capacitor C2 during the turn-off interval of the switch M1 vs. the larger capacitor C2 since the switch M1 will run out of voltage headroom when voltage across the capacitor C1 falls below the dc voltage of the LED strings D6 during the turn-on interval. The tradeoff can be applied to all of the following embodiments of the present invention.

A resistor R1 provides startup of the classic dc-dc converter 100. An inductor T2, which is magnetically coupled to the inductor T1, provides a housekeeping voltage across a bus capacitor C3, and a diode D8 prevents the resistor R1 from being shorted out by the inductor T2 prior to the onset of oscillation. A Zener diode D11 regulates the housekeeping voltage. In some designs, the inductor T2 and the diode D8 are omitted if the current draw of all circuit blocks combined is at an acceptable level to be supplied by the resistor R1 alone, in the interest of cost over efficiency.

The classic dc-dc converter 100 works well under dc-dc conversion. However, in pursuit of a desirable high power factor (PF), the classic dc-dc converter 100 is often elevated to perform alternating current-direct current (ac-dc) conversion. As such, the stabilization capacitor C1 is down-sized to track line voltage V1 and a reference voltage Vref is modulated by a sine wave to regulate the turn-on intervals under varying supply voltage of the stabilization capacitor C1, which produces an averaged line current resembling a sine wave.

However, if the switch M1 is regarded as a sampler and apply the Sampling Theorem, spectrum of full wave-rectified sine wave can be repeated at the sampling rate. A first ripple frequency of an ac-dc converter is 2 times the line frequency, while the first ripple frequency of a dc-dc converter is the switching frequency. That's a world apart for the requirement of the stabilization capacitor C1.

To counter it, a large electrolytic capacitor C2 is implemented, which will increase the turn-on delay and penalize the cost, size and lifetime.

However, since the LED strings of diode D6 has exponential current-voltage (I-V) characteristics, even small voltage ripples will cause current flowing through the LED strings of diode D6 to fluctuate wildly, making the attempt of suppressing the flickers impossible.

A leading-edge blanking A2 is another concern because any variations in the switch M1, the diode D5, or the inductor T1 can change turn-on spike characteristics, so how to pre-define its duration is a guess, in addition to its complexity.

SUMMARY OF THE INVENTION

An embodiment provides a spike-free converter for driving light-emitting diodes. The spike-free converter includes a closed loop direct current-direct current (dc-dc) converting unit, a switch, a first inductor, a first capacitor, a first resistor, and a first diode. The closed loop dc-dc converting unit is used for generating a driving current to drive at least one light-emitting diode strings according to a dc voltage, and generating a switch control signal. The switch is used for receiving the switch control signal and being turned on and turned off according to the switch control signal.

Another embodiment provides a converter. The converter includes a complete direct current-direct current (dc-dc) converting for generating a driving current or voltage. The complete dc-dc converting unit includes a power inductor, a stabilization capacitor, a power switch, a startup resistor, a current detection resistor, and a flyback diode. The current detection resistor and the power inductor are placed on a source side of the switch and are connected in series for a spike-free detected voltage.

The present invention provides a spike-free converter for driving light-emitting diodes. Compared to the prior art, the spike-free converter relocates a first inductor, a first diode, a first capacitor, and at least one light-emitting diode strings to a source terminal of a switch from a drain terminal of the switch shown in the prior art, to enable spike-free current detection of the switch.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
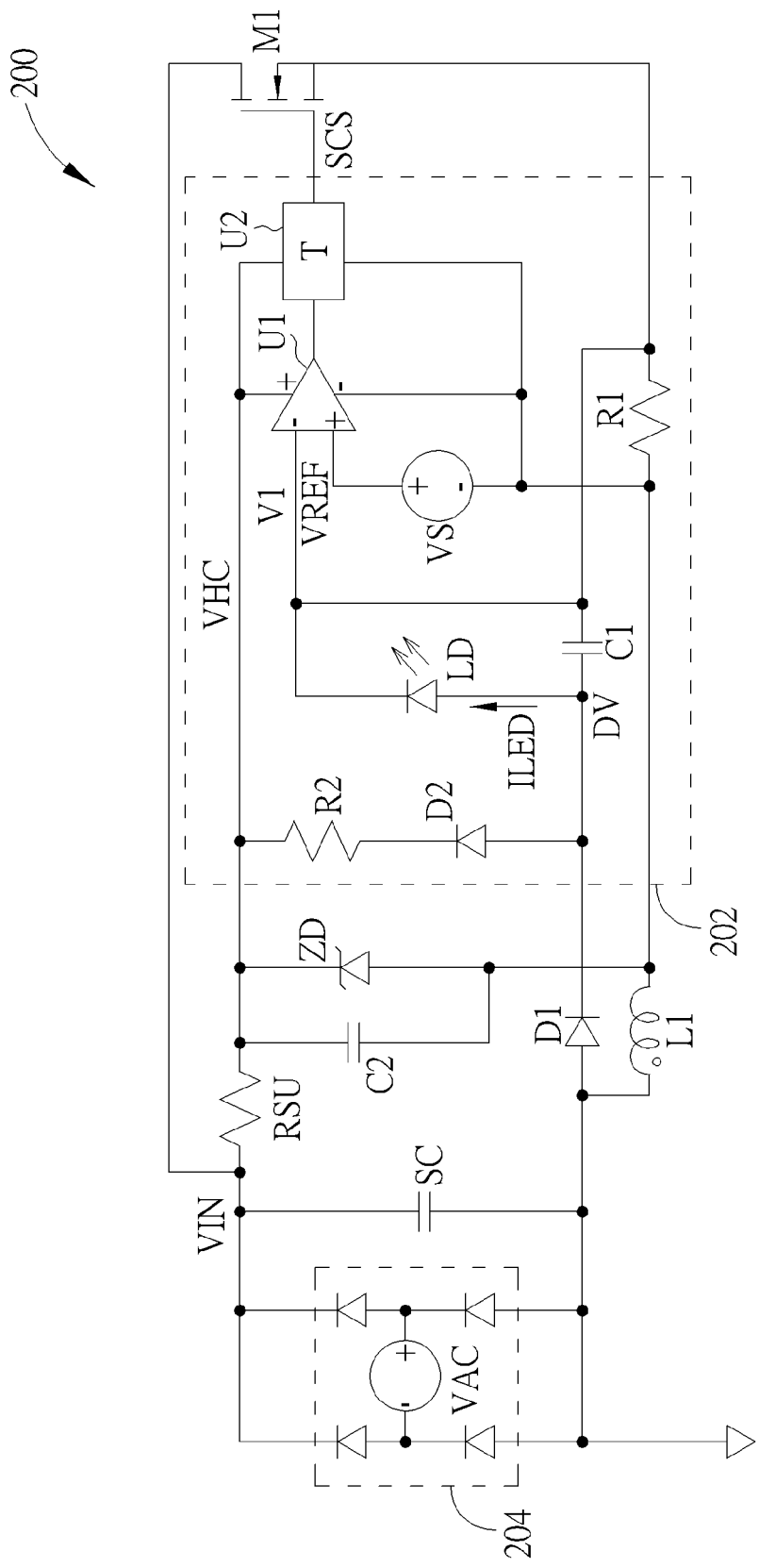
FIG. 2 is a diagram illustrating a spike-free converter for driving light-emitting diodes according to an embodiment.

Please refer to FIG. 2. FIG. 2 is a diagram illustrating a spike-free converter 200 for driving light-emitting diodes according to an embodiment. As shown in FIG. 2, the spike-free converter 200 includes a closed loop direct current-direct current (dc-dc) converting unit 202, a switch M1 (a power switch), a first inductor L1 (a power inductor), and a first diode D1 (a flyback diode). The closed loop dc-dc converting unit 202 is used for generating a driving current ILED to drive at least one light-emitting diode string according to a dc voltage VIN, and generating a switch control signal SCS to the switch M1, wherein the at least one light-emitting diode string includes at least one light-emitting diode (e.g. light-emitting diode (LED) LD). In addition, the dc voltage VIN is generated by a bridge rectifier 204, wherein the bridge rectifier 204 converts an alternating current (ac) voltage VAC into the dc voltage VIN. As shown in FIG. 2, the switch M1 receives the dc voltage VIN and the switch control signal SCS, and is turned on and turned off according to the switch control signal SCS; and the first diode D1 is in series with the first inductor L1 and the LED LD during flyback. In addition, the first inductor L1 and the first diode D1 are coupled to a stabilization capacitor SC, which is grounded.

As shown in FIG. 2, the closed loop dc-dc converting unit 200 includes a comparator U1, a delay block U2, a first resistor R1 (a detection resistor), a second resistor R2 (a bus resistor), a first capacitor C1 (a load capacitor), and a second diode D2 (a bus diode). In addition, the spike-free converter 200 further includes a second capacitor C2 (a bus capacitor) and a Zener diode ZD. As shown in FIG. 2, the second capacitor C2 is used for storing a housekeeping voltage VHC for the comparator U1, the delay block U2 and the second resistor R2, according to the capacitor voltage across the first capacitor C1; and the Zener diode ZD is in parallel with the second capacitor C2 for regulating the housekeeping voltage VHC.

The comparator U1 and the delay block U2 are used for generating the switch control signal SCS according to a reference voltage VREF and a detection voltage V1, wherein the reference voltage VREF is generated by a voltage source VS. The first resistor R1 is connected to a source terminal of the switch M1 and is coupled to the first inductor L1 and the second capacitor C2, wherein the first resistor R1 is used for generating the detection voltage V1. The comparator U1 output feeds the delay block U2, wherein its output is normally high. Turn-on interval of the switch M1 is determined by the first inductor L1 which can ramp up its current till the detected voltage V1 at a second input terminal of the comparator U1 exceeds the reference voltage VREF. Meanwhile, the switch M1 is turned off with the interval equal to T, set by the delay block U2.

As shown in FIG. 2, since a large count of smaller LEDs offer better heat distribution and light dispersion, the LED LD and the first capacitor C1 are placed in series with the first diode D1 (the flyback diode) to increase voltage headroom of the first inductor L1.

The current flowing through the resistor R1 is free from turn-on spikes generated from the switch M1 because the series-connected first resistor R1 and the inductor L1 retard an abrupt change in magnitude inherently. Therefore, the turn-on spikes will detour through the switch M1, the first capacitor C1, and the first diode D1 instead.

During the turn-off interval of the switch M1 (also known as flyback), the delay block U2 turns on the switch M1 at the end of delay time T.

As shown in FIG. 2, there are two operating states that can satisfy the feedback criteria. The first one is static dc operations in continuous analog feedback. The second one involves the switch control signal SCS in the path. Thanks to a time interval introduced by the delay block U2 to disrupt feedback during ramp up/down current of the first inductor L1, the spike-free converter 200 will lock into the second one.

In addition, as shown in FIG. 2, the second diode D2 blocks current flowing through the second resistor R2 to reduce current flowing through a startup resistor RSU during startup of the spike-free converter 200, so the second diode D2 can lower power dissipation of the startup resistor RSU in case the startup resistor RSU isn't disabled in the steady state. Also unique in this design is the second diode D2 can be omitted when dc voltage of the LED string LD is high, thanks to high value of the second resistor R2 providing isolation during startup. In addition, the second resistor R2 is used for balancing a voltage difference between the second capacitor C2 and the first capacitor C1.

Figure 1:
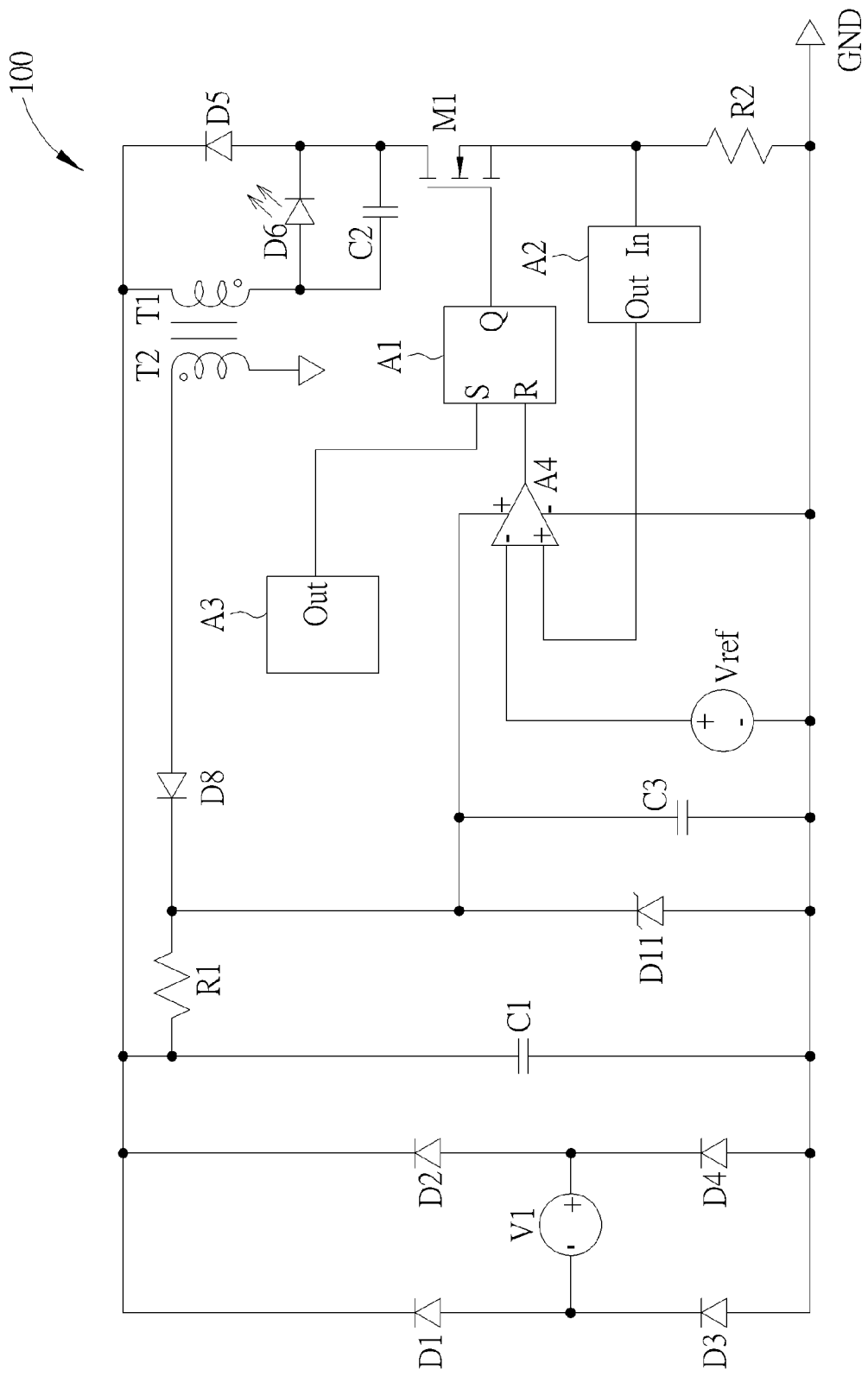
FIG. 1 is a diagram illustrating a classic dc-dc converter as an offline light-emitting diode driver.

Compared to FIG. 1, the spike-free converter 200 not only utilizes the comparator U1 and delay block U2 to replace the clock generator A3 and the R/S flip-flop A1, but can also eliminate a requirement for leading-edge blanking. Moreover, the spike-free converter 200 is far more accurate because of close-loop feedback.

This self-clocked, close-loop feedback of the spike-free converter 200 is superior to other methods (provided by the prior art) of detecting maximum switching current that are driven by an external clock, and use the correlations to estimate current flowing through the LED string in open loop for a given clock frequency.

Figure 3:
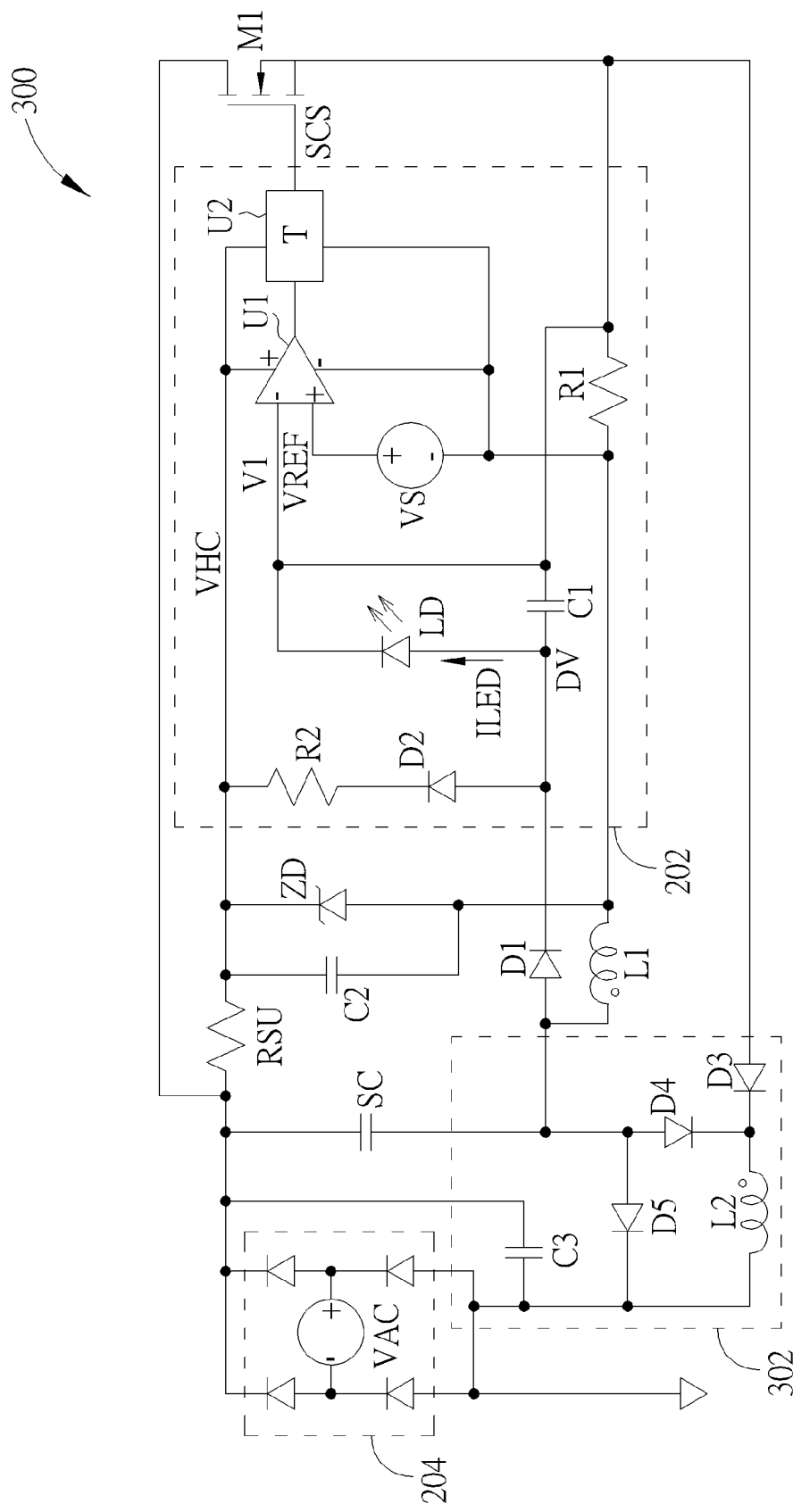
FIG. 3 is a diagram illustrating a flicker-free converter for driving light-emitting diodes according to another embodiment.

Please refer to FIG. 3. FIG. 3 is a diagram illustrating a flicker-free (always spike-free) converter 300 for driving light-emitting diodes according to another embodiment. As shown in FIG. 3, a difference between the flicker-free converter 300 and the spike-free converter 200 is that the flicker-free converter 300 further includes a closed loop alternating current-direct current (ac-dc) converting unit 302. The closed loop ac-dc converting unit 302 includes a third capacitor C3 (a decoupling capacitor), a third diode D3 (an isolation diode), a fourth diode D4 (a power factor correction, a.k.s. PFC, flyback diode), a fifth diode D5 (a startup diode), and a second inductor L2 (a PFC power inductor). Thus, because the flicker-free converter 300 further includes the closed loop ac-dc converting unit 302, the flicker-free converter 300 becomes a nested ac-dc converter, wherein the closed loop dc-dc converting unit 202 and the closed loop ac-dc converting unit 302 share the switch M1, the closed loop dc-dc converting unit 202 and the closed loop ac-dc converting unit 302 perform equivalency of two-stage ac-dc conversion consisting of a first power factor (PF) correction stage and a second dc-dc conversion stage, and is truly flicker free despite having the one-stage architecture.

As shown in FIG. 3, the third capacitor C3, the second inductor L2, the third diode D3, the fourth diode D4, and the switch M1 form a boost converter to charge up a stabilization capacitor SC with high power factor. The first inductor L1, the first diode D1, and the switch M1 work as a buck/boost converter to tailor dc voltage for the LED LD.

The fifth diode D5 only charges up a stabilization capacitor SC during startup of the flicker-free converter 300 to initiate current of the first inductor L1, allowing the second inductor L2 to piggyback concurrently. Thus, the fifth diode D5 can prevent unchecked current of the second inductor from damaging the switch M1 because the current of the second inductor bypasses the detection resistor R1, to avoid rich harmonics of the second inductor L2 corresponding to the line voltage VAC causing flickers on the LED LD.

As shown in FIG. 3, the third diode D3 isolates the closed loops corresponding to the first inductors L1 and the second inductor L2, i.e., preventing the inductor L1 and the fourth diode D4 from forming a loop during flyback. The fourth diode D4 is a flyback diode of the boost converter. The second resistors R2 and the first resistor R1 perform the same functions as FIG. 2. As a result, while the switch M1 is shared by the boost and buck/boost converters, the switch M1 switching action is governed by the closed loop spike-free dc-dc converter at a core of the flicker-free converter 300 exclusively.

In addition, operational principles of the second capacitor C2, the Zener diode ZD, and the second diode D2 are the same as operational principles of the second capacitor C2, the Zener diode ZD, and the second diode D2, in FIG. 2, so further description thereof is omitted for simplicity.

Since high duty cycle increases boost converter output voltage and the high dc voltage VIN decreases boost/buck converter duty cycle, this counteraction can keep the closed loop ac-dc converter operating in a narrow range of turn-on intervals, to improve the dc voltage VIN regulation. This is made possible only because the switch is shared.

After the switch M1 operates with narrow turn-on intervals, it results in an averaged ac current of the second inductor L2 to resemble a sine wave for high PF correction without the flickers.

Figure 4:
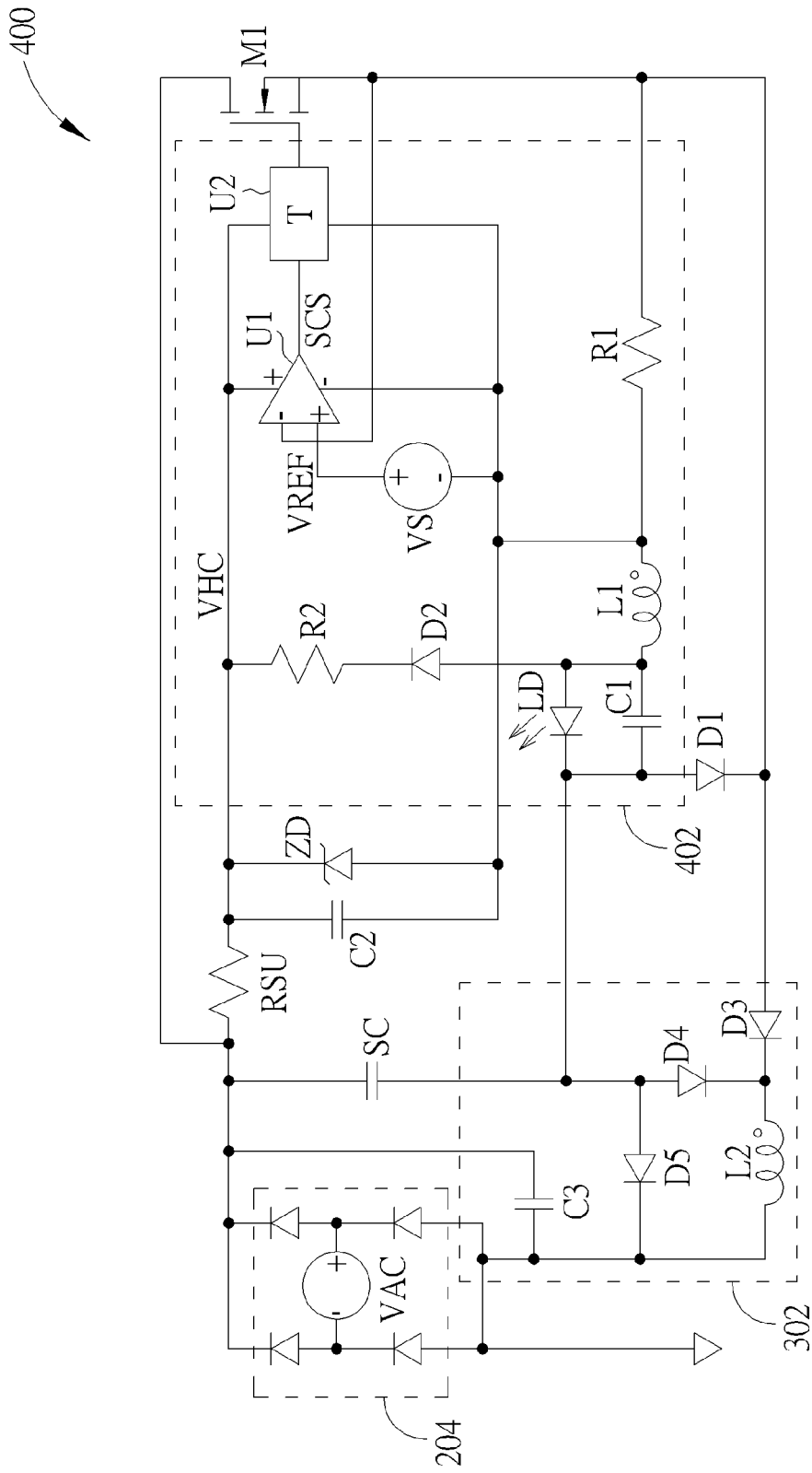
FIG. 4 is a diagram illustrating a flicker-free converter for driving light-emitting diodes according to another embodiment.

Please refer to FIG. 4. FIG. 4 is a diagram illustrating a flicker-free converter 400 for driving light-emitting diodes according to another embodiment. A difference between the flicker-free converter 400 and the flicker-free converter 300 is that a closed loop dc-dc converting unit 402 is different from the closed loop dc-dc converting unit 202. Sometimes high-power LEDs are selected for better cost and smaller form factor, so the LED LD and the first capacitor C1 included in the closed loop dc-dc converting unit 402 can be connected in series with the first inductor L1 shown in FIG. 4 to moderate size of the first inductor L1 thanks to additional charging on the first capacitor C1 during turning-on interval of the switch M1. In addition, it is noted that the first diode D1 and the second diode D2 bootstrap the second capacitor C2 to the first capacitor C1, and the second resistor R2 is used for balancing a voltage difference between the second capacitor C2 and the first capacitor C1. Further, subsequent operational principles of the flicker-free converter 400 are the same as those of the flicker-free converter 300, so further description thereof is omitted for simplicity.

Figure 5:
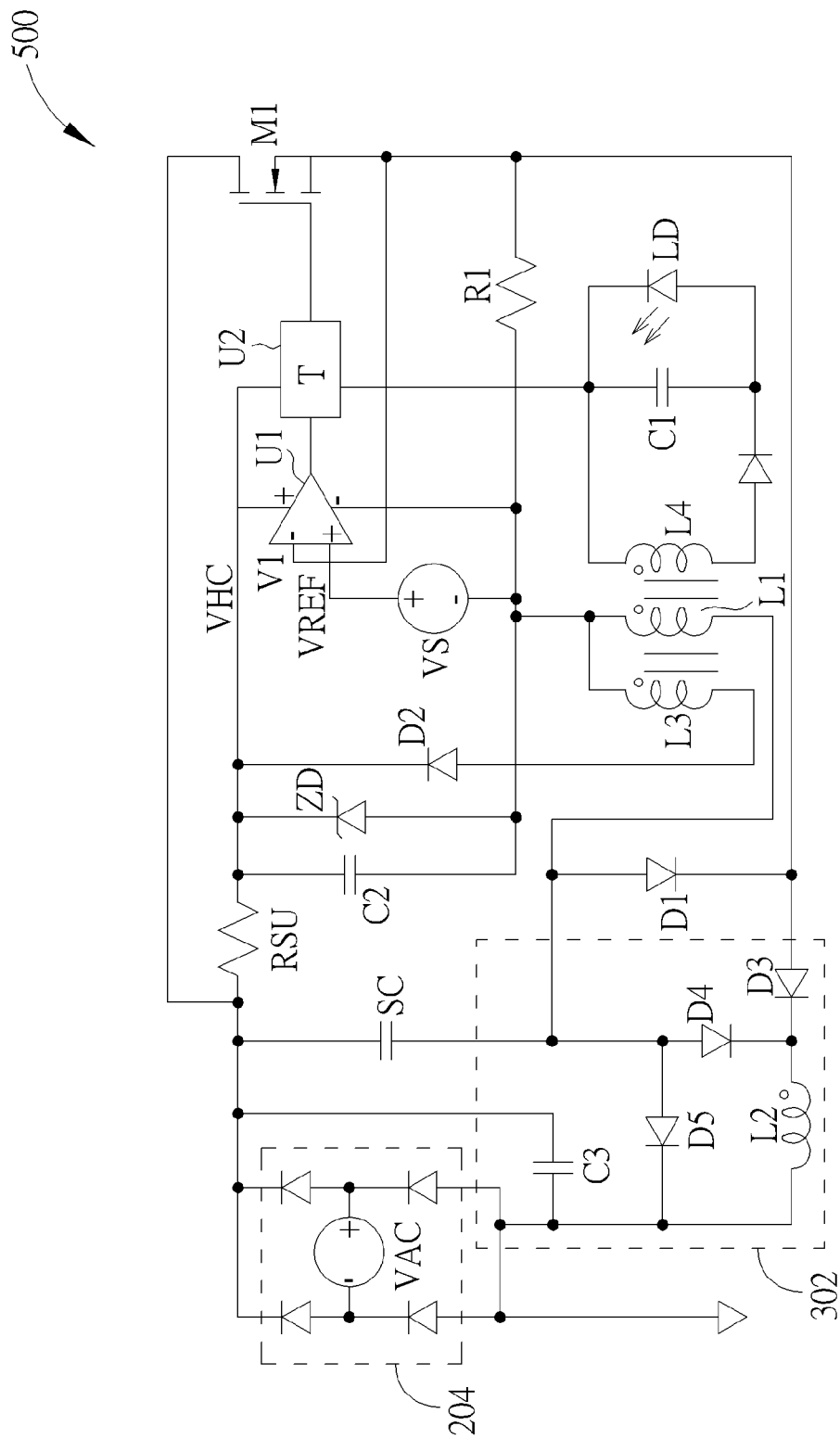
FIG. 5 is a diagram illustrating a flicker-free converter for driving light-emitting diodes according to another embodiment.

Please refer to FIG. 5. FIG. 5 is a diagram illustrating a flicker-free converter 500 for driving light-emitting diodes according to another embodiment. A difference between the flicker-free converter 500 and the flicker-free converter 400 is that the flicker-free converter 500 further includes a third inductor L3 and a fourth inductor L4, wherein the third inductor L3 and the fourth inductor L4 are coupled to the first inductor L1 to form a triple-coupled inductor group. Therefore, the triple-coupled inductor group can be applied to an isolated power supply application for the LED LD. Flyback occurs on the fourth inductor L4 side after the switch M1 cuts off current of the first inductor L1.

Turn ratio of the first inductor L1 to the fourth inductor L4 adjusts the flyback voltage referred from the fourth inductor L4 to the first inductor L1 to adjust duty cycle of the switch M1. In addition, the third inductor L3 has the proper turn ratio for charging a correct housekeeping voltage to the second capacitor. Further, subsequent operational principles of the flicker-free converter 500 are the same as those of the flicker-free converter 400, so further description thereof is omitted for simplicity.

Figure 6:
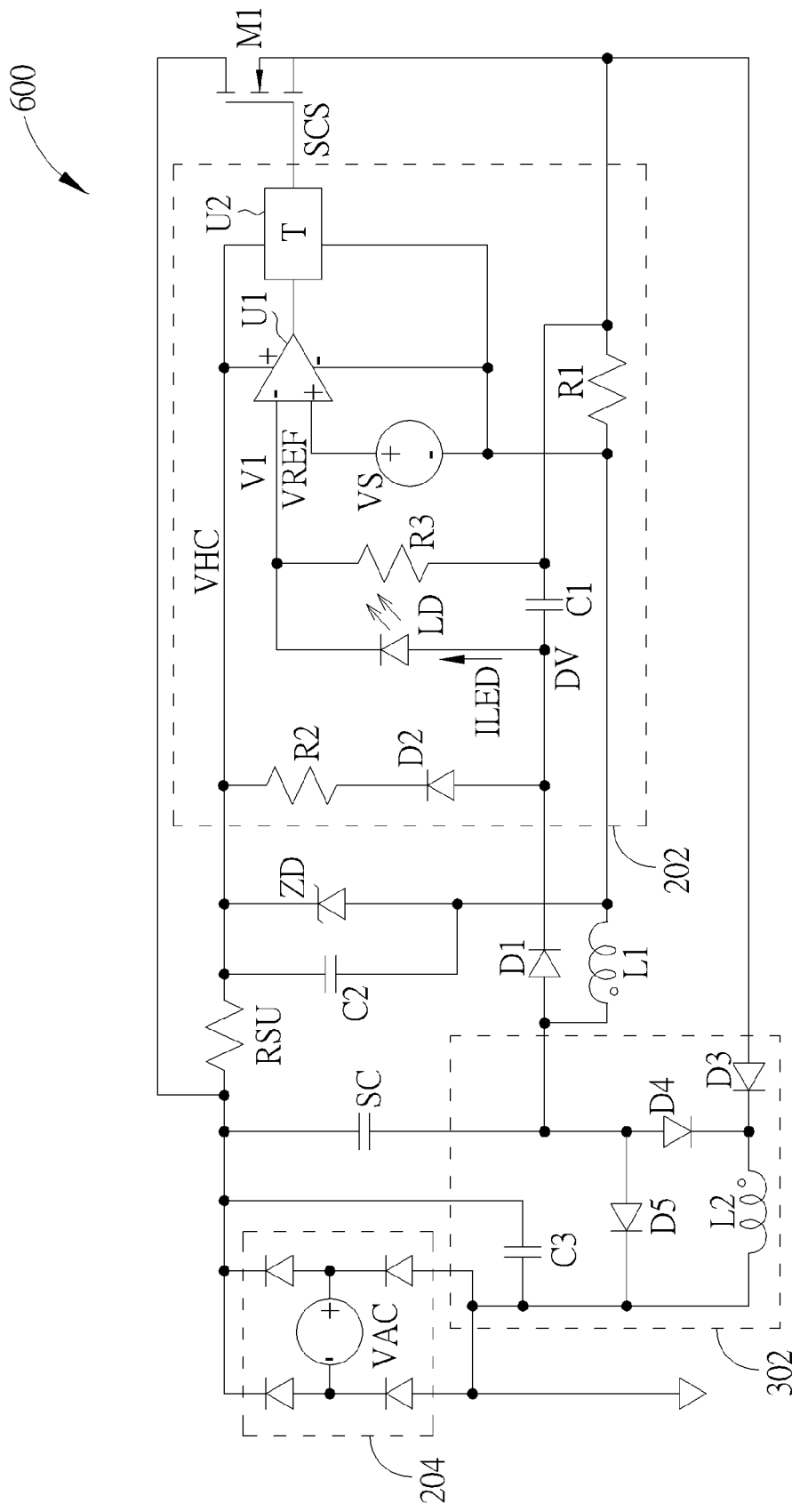
FIG. 6 is a diagram illustrating a flicker-free converter for driving light-emitting diodes according to another embodiment.

FIG. 6 builds upon FIG. 3's foundation, wherein a third resistor R3 is placed inside the loop of the first capacitor C1 and the LED LD to detect current of the LED LD directly. It is free from the turn-on spikes because the series-connected resistor R3 and diode LD are connected across the capacitor C1, given that capacitor voltage as well as inductor current retards an abrupt change in magnitude inherently. The detected voltage now consists of the voltage sum across the first resistor R1 and the third resistor R3, and continues to be spike free.

Voltage across the resistor R3 is filtered to look like a saw tooth because it's constantly charging and discharging, whereas voltage across the resistor R1 consists of current through the resistor R3 but is further superimposed with switching pulses of the switch M1. If the third resistor R3 is chosen bigger than the first resistor R1 in value, this ac-dc converter will regulate current of the LED LD primarily by virtue of larger voltage contribution from the third resistor R3.

Under low reference voltage conditions such as low power levels with analog dimming, the extra third resistor R3 serves as an important ballast resistor to ensure an accurate switching control when the reference voltage VREF becomes low.

It's a self-fulfilling condition, i.e., if there is no steady LED current, there won't be a reliable counter voltage to turn off the switch M1 accurately. Prior arts always detects transient voltage across the detection resistor R1 beyond the leading-edge blanking interval, and is therefore erratic when the reference voltage VREF becomes very low, limiting its useful dimming range before the flicker sets in.

In all of the above mentioned figures, the startup resistor RSU can be implemented by a depletion mode field-effect transistor (FET) for a faster startup time, and is then disabled to minimize power consumption in steady state. Features like under voltage lockout, over voltage lockout, over temperature lockout, electromagnetic disturbance (EMI) suppression, ESD and protection fuse, etc. are not mentioned because there are known arts and are often included as needed.

Figure 7:
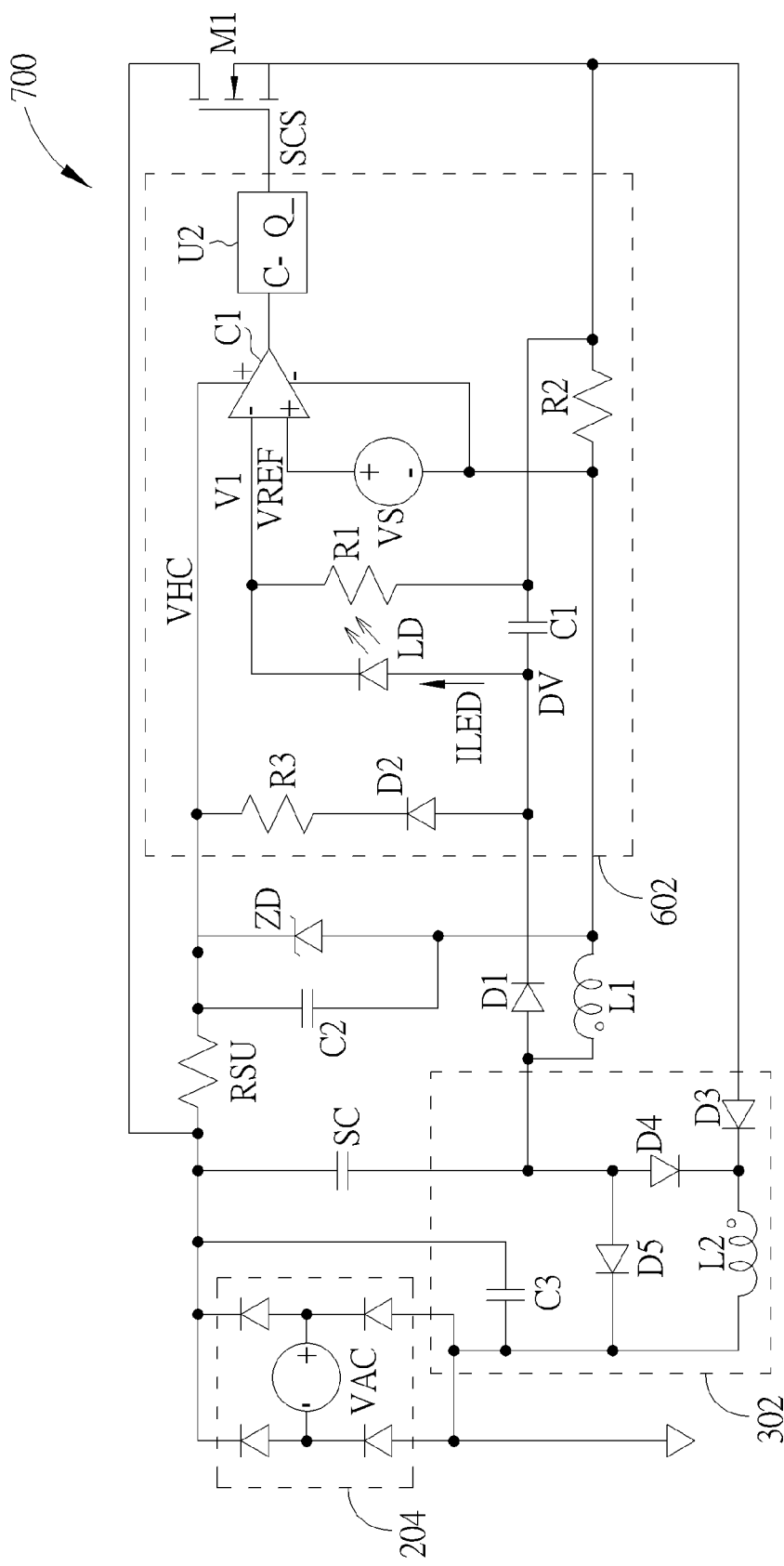
FIG. 7 is a diagram illustrating a spike-free converter with a monostable multivibrator for implemented the delay block according to the first embodiment.

Please refer to FIG. 7. FIG. 7 is a diagram illustrating an embodiment with a delay block U2 consisting of a monostable multivibrator U2. A negative pulse from previous stage causes a state change for a specific time interval T, which occurs when the detected voltage exceeds Vref. Q_ is the nominal output.

As shown in FIG. 7, there are two operating states that can satisfy the feedback criteria. The first one is static dc operations in continuous analog feedback. The second one involves the switch control signal SCS in the path. Thanks to a time interval introduced by the monostable multivibrator, the spike-free converter 700 will lock into the second one.

Figure 8:
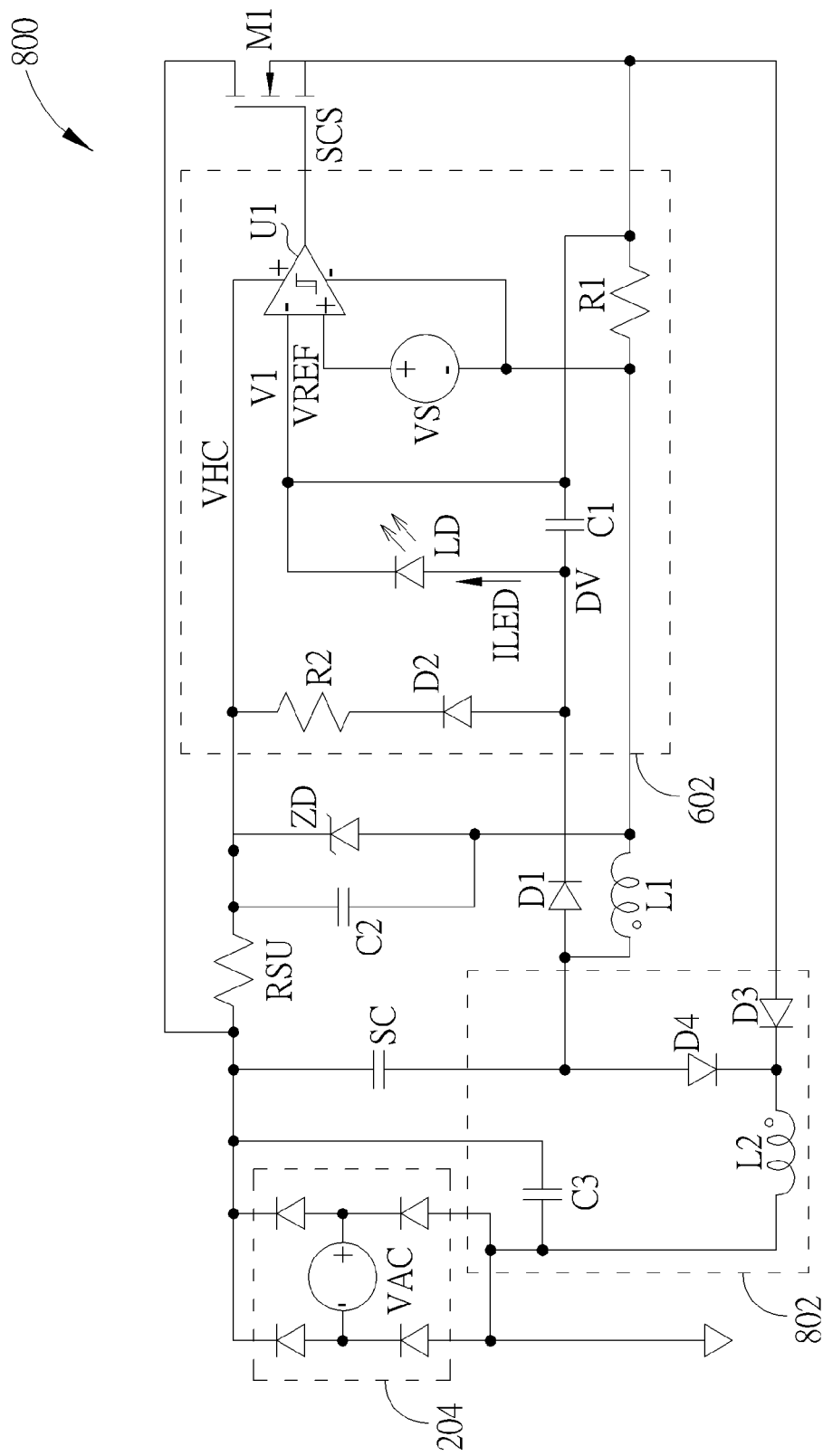
FIG. 8 is a diagram illustrating a spike-free converter with a hysteresis comparator for implemented the delay block according to the second embodiment.

As shown in FIG. 8, the second embodiment with a delay block U2 is simply a hysteresis embedded in the comparator U1.

The hysteresis comparator U1 generates the switch control signal SCS according to a reference voltage VREF and a detection voltage V1. The hysteresis comparator U1 increases a reference voltage to a sum of the reference voltage VREF and a hysteresis voltage $\Delta V$ when the switch M1 is turned on, or to stay at the reference voltage VREF when the switch M1 is turned off. The turning-on interval of the switch M1 is determined by the first inductor L1 which can ramp up the current ILED till the detection voltage V1 at a second input terminal of the comparator U1 exceeds the reference voltage VREF and the hysteresis voltage ΔV. Meanwhile, the switch M1 is turned off.

During the turning-off interval of the switch M1, the first capacitor C1 discharges against the LED LD till the detected voltage across the first resistor R1 is below VREF to trigger the comparator U1 to turn on the switch M1.

As shown in FIG. 8, there are two operating states that can satisfy the feedback criteria. The first one is static dc operations in continuous analog feedback. The second one involves the switch control signal SCS in the path. Thanks to a time interval introduced by hysteresis to ramp up/down current of the first inductor L1, the spike-free converter 200 will lock into the second one.

To sum up, compared to the prior art, the spike-free converter for driving light-emitting diodes provided by the invention relocates the first inductor, the first diode, the first capacitor, and the at least one light-emitting diode strings to the source terminal of the switch from the drain terminal of the switch shown in the prior art, to enable spike-free current detection of the switch. This spike-free converter also forms the core of a flicker-free converter with the additions of the second inductor, the third, fourth and the fifth diodes, and the third capacitor.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A spike-free converter for driving light-emitting diodes, the spike-free converter comprising:
   a switch for receiving a switch control signal and being turned on and turned off according to the switch control signal; and
   a closed loop direct current-direct current (dc-dc) converting unit with time-disruptive feedback to disrupt static dc operations of continuous analog feedback of the switch for generating a driving current to drive at least one light-emitting diode string according to a dc voltage, and generating a switch control signal.

2. The spike-free converter of claim 1, wherein the closed loop dc-dc converting unit further comprises:
   a delay block for disrupting static dc operations of continuous analog feedback of the switch to generate the switching control signal to the switch according to a reference voltage and a delay time.

3. The spike-free converter of claim 1, wherein the closed loop dc-dc converting unit further comprises:
   a monostable multivibrator for disrupting static dc operations of continuous analog feedback of the switch to generate the switching control signal to the switch according to a delay time.

4. The spike-free converter of claim 1, wherein the closed loop dc-dc converting unit further comprises:
   a hysteresis comparator for disrupting static dc operations of continuous analog feedback of the switch to generate the switching control signal to the switch according to a reference voltage and a hysteresis voltage.

5. The spike-free converter of claim 1, wherein the closed loop dc-dc converting unit further comprises:
   a first diode for being in series with the at least one light-emitting;
   a first inductor connected to a stabilization capacitor and is coupled to a second capacitor and the first resistor; and
   a first resistor connected to a source terminal of the switch and coupled to the first inductor and the second capacitor;
   wherein the first diode is coupled to the stabilization capacitor and the first inductor, and the at least one light-emitting diode is coupled to the source terminal of the switch.

6. The spike-free converter of claim 1, wherein the closed loop dc-dc converting unit further comprises:
   a first diode for being connected with a source terminal of the switch; and
   a first inductor connected to the first resistor and coupled to the at least one light-emitting diode and the first capacitor; and
   a first resistor connected to the source terminal of the switch and coupled to the first inductor and the second capacitor;
   wherein the first diode is coupled to the first capacitor, the at least one light-emitting diode and a stabilization capacitor, and the at least one light-emitting diode is coupled to the stabilization capacitor.

7. The spike-free converter of claim 5, wherein the first resistor is used for generating a spike-free detection voltage.

8. The spike-free converter of claim 7, wherein the closed loop dc-dc converting unit further comprises:
   a first capacitor being in parallel with the at least one light-emitting diode and in series with the first diode to receive charges during flyback;
   a second capacitor for storing a housekeeping voltage for the comparator and the delay block from the first capacitor directly;
   a second resistor coupled to the comparator, a delay block and a startup resistor, wherein the second resistor balances a voltage difference between the first capacitor and the second capacitor; and
   a second diode being in series with the second resistor for blocking current flowing through the second resistor to reduce current flowing through the startup resistor during startup of the spike-free converter, wherein the second diode can be omitted when a dc voltage of the light emitting diode (LED) string is high enough to provide sufficient isolation during startup.

9. The spike-free converter of claim 8, further comprising:
   a flicker-free closed loop alternating current-direct current (ac-dc) converting unit, comprising:
   a second inductor connected to the ground and coupled to the third diode and the fourth diode;
   a third capacitor connected to the ground and coupled to the stabilization capacitor and the switch to decouple the second inductor to the ground;
   a third diode connected to the source terminal of the switch and coupled to the second inductor and the fourth diode;
   a fourth diode connected to the stabilization capacitor and coupled to the second inductor and the third diode, wherein the second inductor, the third diode, the fourth diode, and the switch form a boost converter to charge up the stabilization capacitor with high power factor; and
   a fifth diode connected to the ground and coupled to a stabilization capacitor for charging up the stabilization capacitor during startup of the flicker-free converter.

10. The flicker-free converter of claim 9, wherein the first resistor is further used for generating a flicker-free detection voltage.

11. The flicker-free converter of claim 9, wherein the switch regulates the turn-on intervals through counteraction between the dc-dc converter and the ac-dc converter to enhance the power factor and the voltage regulation.

12. The flicker-free converter of claim 9, wherein the third diode isolates the loops of boost and boost/buck converters during flyback.

13. The flicker-free converter of claim 9, further comprising:
a third resistor connected to the LED and coupled to the first resistor, the first capacitor and the source terminal of the switch.

14. The flicker-free converter of claim 13, wherein the third resistor functions as a ballast resistor for accurately switching control under low reference voltage conditions.

15. The flicker-free converter of claim 12, further comprising:
a third inductor; and
a fourth inductor, wherein the third inductor and the fourth inductor are coupled to the first inductor to form a triple-coupled inductor group;
wherein the triple-coupled inductor group is applied to an isolated power supply application for the at least one light-emitting diode strings.

16. The spike-free converter of claim 6, wherein the first resistor is used for generating a spike-free detection voltage.

17. The spike-free converter of claim 16, wherein the closed loop dc-dc converting unit further comprises:
a first capacitor in parallel with the at least one light-emitting diode and in series with the first inductor to receive additional dc charges during the turn-on intervals;
a second capacitor for storing a housekeeping voltage for the comparator and the delay block from the first capacitor;
a second resistor coupled to the comparator and delay block and a startup resistor, wherein the second resistor balances the voltage difference between the first capacitor and the second capacitor; and
a second diode in series with the second resistor for blocking current flowing through the second resistor to reduce current flowing through the startup resistor during startup of the spike-free converter.

18. The spike-free converter of claim 17, further comprising:
a flicker-free closed loop alternating current-direct current (ac-dc) converting unit, comprising:
a second inductor connected to the ground and coupled to the third diode and the fourth diode;
a third capacitor connected to the ground and coupled to the stabilization capacitor to decouple the second inductor to the ground;
a third diode connected to the source terminal of the switch and coupled to the second inductor and the fourth diode;
a fourth diode connected to the stabilization capacitor and coupled to the second inductor and the third diode, wherein the second inductor, the third diode, the fourth diode, and the switch form a boost converter to charge up the fourth capacitor with high power factor; and
a fifth diode connected to the ground and coupled to the stabilization capacitor and the fourth diode for charging up a stabilization capacitor during startup of the flicker-free converter.

19. The flicker-free converter of claim 18, wherein the first resistor is further used for generating a flicker-free detection voltage.

20. The flicker-free converter of claim 18, wherein the switch regulates the turn-on intervals through counteraction between the dc-dc convertor and the ac-dc convertor to enhance the power factor and the voltage regulation.

21. The flicker-free converter of claim 18, wherein the third diode isolates the loops of boost and boost/buck converters during flyback.

22. The spike-free converter of claim 21, further comprising:
a third inductor; and
a fourth inductor, wherein the third inductor and the fourth inductor are coupled to the first inductor to form a triple-coupled inductor group;
wherein the triple-coupled inductor group is applied to an isolated power supply application for the at least one light-emitting diode strings.

23. The spike-free converter of claim 17, wherein the first diode and the second diode bootstrap a voltage of the second capacitor to a voltage of the first capacitor during flyback.

24. A converter, comprising:
a complete direct current-direct current (dc-dc) converting unit for generating a driving current or voltage, the complete dc-dc converting unit comprising:
a power inductor;
a stabilization capacitor;
a power switch;
a startup resistor;
a current detection resistor; and
a flyback diode;
wherein the current detection resistor and the power inductor are placed on a source side of the switch and are connected in series for a spike-free detected voltage.

25. The spike-free dc-dc converter of claim 24, further comprising:
a flicker-free ac-dc converter, comprising:
a second inductor;
a third capacitor;
a third diode;
a fourth diode; and
a fifth diode; wherein the second inductor piggybacks the power inductor performing PFC, the third capacitor decouples the second inductor, the third diode isolates the loops current during flyback, the fourth diode is a PFC flyback diode and the fifth diode starts the power inductor in startup, for the flicker-free ac-dc converter.

26. The flicker-free converter of claim 25, wherein the switch regulates the turn-on intervals through counteraction between the dc-dc convertor and the ac-dc convertor to enhance the power factor and the voltage regulation.

27. The flicker-free converter of claim 25, further comprising:
a ballast resistor inside the LED current loop and is in series with the detection resistor for reliable switching operations under low reference voltage conditions.

* * * * *